INVENTOR.
DUNCAN K. SMITH
ANTHONY J. LAST
BY
Attorney

United States Patent Office 3,531,406
Patented Sept. 29, 1970

3,531,406
METHOD AND APPARATUS FOR THE FAIL-SAFE INTRODUCTION OF A BACTERICIDAL GAS INTO LIQUID SEWAGE
Duncan K. Smith, and Anthony J. Last, Oakville, Ontario, Canada, assignors to Ontario Research Foundation, Sheridan Park, Ontario, Canada
Filed Aug. 23, 1968, Ser. No. 754,906
Int. Cl. C02b 3/06, 5/02
U.S. Cl. 210—62                                4 Claims

ABSTRACT OF THE DISCLOSURE

A method and apparatus for introducing a fluid, such as chlorine gas, into a liquid, such as liquid sewage. A vortex of low-pressure is created in the liquid by injecting it tangentially into a vortex chamber having a coaxial outlet tube. As the rotating liquid passes from the chamber into the tube it increases its rotational speed and creates a zone of low pressure. This low pressure is utilized to draw the fluid into contact with the liquid at the low-pressure zone.

---

This invention relates to a method and apparatus for the fail-safe admission of a fluid into a liquid so as to obtain an intimate mixture of the two. More particularly, this invention relates to a method and apparatus for the fail-safe admission of a fluid disinfectant into liquid sewage, while at the same time causing a high degree of disruption of the sewage to bring about an intimate mixture of the disinfectant with the sewage. This invention has particularly application to the chlorination of sewage by the admission of chlorine gas at a point of maximum sewage disruption.

In the conventional chlorination of raw sewage, only the supernatant liquid after settling of solids is treated before discharge. This means that a raw undisinfected sludge has to be disposed of in some way. Chlorine contact times in conventional treatments are fifteen to thirty minutes, and this requires large holding tanks.

If, in conventional chlorination processes, chlorination of the whole body of raw sewage were carried out, the apparent bacterial kill would likely be greater than in a process where only the supernatant liquid is chlorinated. However, if the sewage is disrupted after chlorination of the whole body of sewage, the bacterial counts increase 50 to 11,000 fold. The reason for the higher counts after disruption is that in the bacterial plate count method, several organisms embedded in one particle will give rise to only one countable colony, whereas on disruption of that particle, each bacterium will give rise to a countable colony on the plate—hence the higher counts on disrupting the sewage.

A further disadvantage of the conventional process is that the chlorination of the supernatant liquid from settled raw sewage is normally carried out by an indirect method, i.e. chlorine gas is mixed with pure water or a portion of the waste water in an ejector system. The ejector system provides a vacuum by a venturi effect so that the more dangerous practice of using chlorine gas under pressure is avoided. The vacuum system provides a fail-safe feature, but it results, in effect, in dosing the bulk of the waste with a solution of hypochlorous acid or, more likely, the much less active hypochlorite and inorganic and organic chloramines.

In view of the above disadvantages of conventional disinfectant processes, it is one object of this invention to provide a method and apparatus for disinfecting sewage which is ideally suited to the use of chlorine gas, and which does not require the prior dissolution of chlorine in water.

It is a further object of this invention to provide a method and apparatus for the disinfection of sewage which is completely fail-safe.

Yet a further object of this invention is to provide a method and apparatus for disinfecting sewage which brings the disinfectant into contact with the whole body of the sewage, and not just with the supernatant liquid.

A further object of this invention is to provide a method and apparatus for disinfecting sewage which, at the point of disinfectant admission, causes a maximum disruption of the sewage so that the particulate matter is broken up and comminuted practically simultaneously with its contact by the disinfectant.

Accordingly, this invention provides a method for the fail-safe introduction into liquid of a fluid, the method comprising the steps: providing a vortex chamber of circular cross-section having a coaxial outlet tube of which the downstream end terminates in a liquid body, continuously introducing said liquid into said vortex chamber and causing said liquid to rotate in said vortex chamber, such that liquid passes along said outlet tube while rotating therein, thereby creating along the common axis of the vortex chamber and the outlet tube a zone in which the pressure is below that at the downstream end of the outlet tube, providing a reservoir of said fluid under a pressure above that in said zone but below that at the downstream end of the outlet tube, and utilizing the low pressure in said zone to draw said fluid into contact with the liquid in said zone, such that cessation of the continuous introduction of liquid into the vortex chamber halts the feed of fluid into the zone.

This invention further provides an apparatus for the fail-safe introduction into liquid of a fluid, comprising: means defining a vortex chamber of circular cross-section having a coaxial outlet tube of which the downstream end terminates in a liquid body, a substantially tangential inlet into said vortex chamber, pump means for continuously introducing said liquid under pressure into said vortex chamber through said tangential inlet, such that said liquid is caused to rotate in said vortex chamber and to pass along said outlet tube while rotating therein, thereby creating along the common axis of the vortex chamber and the outlet tube a zone in which the pressure is below that at the downstream end of the outlet tube, a reservoir of said fluid under a pressure above that at said zone but below that at the downstream end of the outlet tube, and a conduit from said reservoir to a location within said zone, such that the pressure differential between said reservoir and said zone causes fluid to pass into said zone, such that cessation of the continuous introduction of liquid into the vortex chamber halts the feed of fluid into the zone.

One embodiment of this invention is shown in the accompanying drawings, in which like numerals denote like parts throughout the several views, and in which.

The basic device from which this invention proceeds is known is a "vortex whistle," and was originally postulated by Vonnegut in the article "A Vortex Whistle," the Journal of Acoustical Society of America, volume 26, No. 1, 1954, pages 18–20. Essentially, the "vortex whistle" consists of a cylinder into which gas or liquid is introduced tangentially under pressure, thereby to cause a rotary motion inside the cylinder. A coaxial outlet from the cylinder is in the form of another cylinder or tube of smaller diameter. During the passage of the fluid from the larger to the smaller diameter cylinder, the speed of rotation is increased according to the law of conservation of momentum. The rotation of the fluid inside the cylinders causes a drop in pressure, or "vortex," along part or all of the common axis of the cylinders. As the fluid approaches the downstream end of the exit tube, it becomes unstable and periodic fluctuations in the motion are produced. Part of these fluctuations are radiated outward as sound, hence the name "vortex whistle."

To achieve the "whistle" sound in the vortex whistle, a gas must be used. However, exactly the same charteristics obtain when a fluid is used to create the vortex. The only difference is that, generally speaking, any "sound" produced is in the subsonic range, and cannot be heard. In the present invention, the vortex is created by sewage effluent, and since it is desired to disrupt the sewage to a maximum degree, a particular advantage arises from the high shear forces obtaining at both ends and along the length of the outlet tube. As the raw sewage is being torn apart and disintegrated in the outlet tube, a bactericidal gas, such as chlorine gas, is aspirated into the low-pressure vortex simultaneously. When chlorine gas is used, it dissolves immediately in the sewage.

It is desirable to arrange the apparatus such that the point at which the chlorine is admitted is at or near the change of area between the large and small cylinders, because it has been found that this is the point of lowest pressure in the vortex along the axis of the vortex chamber and the outlet tube. In this invention, chlorine gas is not forced into the vortex, but rather is allowed to be drawn into the vortex by virtue of the low-pressure obtaining at that point. With this kind of arrangement, a fail-safe feature is provided, whereby the chlorine gas ceases to be drawn into the apparatus in the event of failure of the pump means forcing sewage tangentially into the vortex chamber. Thus, since the apparatus relies upon the pressure differential for the admission of chlorine gas to the sewage, it is desirable to select the point of admission where the pressure is least, in order to take advantage of a maximum differential. As pointed out above, it has been found that the least pressure occurs at the upstream end of the outlet tube.

Figure 1:
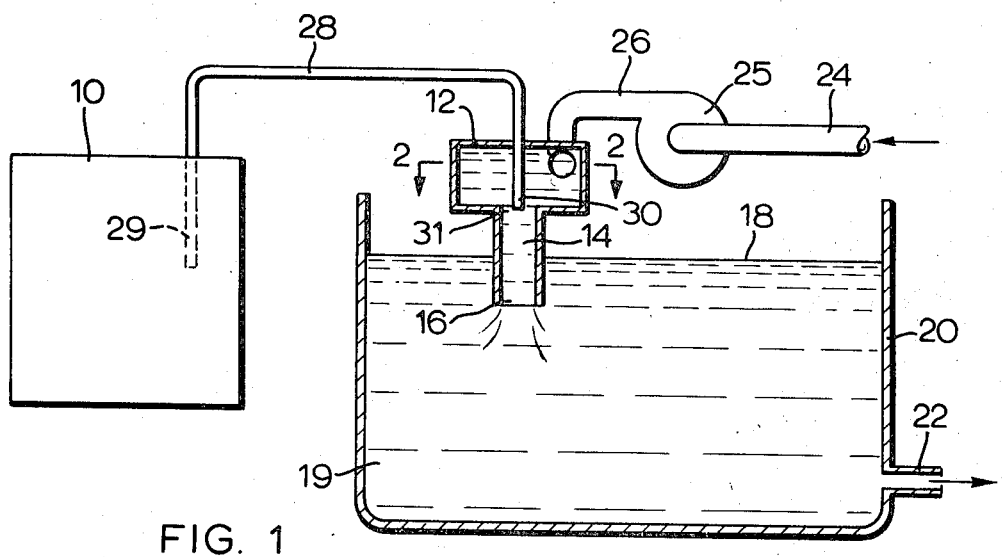
FIG. 1 is a schematic diagram of an apparatus for disinfecting raw sewage.

Turning now to FIG. 1, the apparatus provided by this invention is seen to include a disinfectant reservoir 10. Where a dangerous gaseous disinfectant such as chlorine is used, it is preferable to maintain the pressure of the gas in the reservoir 10 slightly below atmospheric pressure, so that any leaks which develop will not release the gas into the atmosphere. However, it is not essential to this invention that the pressure in the reservoir 10 be below atmospheric.

A vortex chamber 12 of circular cross-section is provided, and has a coaxial outlet tube 14 of smaller diameter than the chamber 12. In this embodiment, the downstream end 16 of the outlet tube 14 is located below a liquid-air interface 18 which constitutes the upper surface of a body of liquid 19 which, in this case, is made up of disinfected sewage. The disinfected sewage 19 is contained in an open tank 20 which has an outlet 22 which conducts the disinfected sewage either to disposal or to further process steps. It is not essential that the body of liquid 19 be exposed to the atmosphere. As will be explained below, the liquid 19 could be contained in a sealed pressurized vessel, provided the essential pressure relationships (later to be defined) are maintained.

Figure 2:
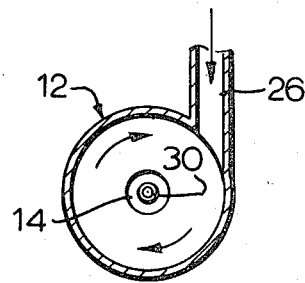
FIG. 2 is a sectional view taken at the line 2—2 in FIG. 1.

Incoming raw sewage passes through a pipe 24, through a pump 25, and along a further pipe 26. As can be seen in FIG. 2, the pipe 26 constitutes a tangential inlet for the chamber 12. Because of the tangential orientation of the inlet pipe 26, the sewage in the chamber 12 is caused to rotate in the direction of the arrows in FIG. 2. A conduit 28 has one end 29 in communication with the disinfectant in the reservoir 10, and has its other end 30 terminating at or near the upstream end 31 of the outlet tube 14. This is the preferred point of introduction of disinfectant into the sewage, because it has been found that the pressure at this point at least, and the disruption of sewage near to maximum. Naturally, the method and apparatus of this invention would still function with the admission of disinfectant taking place at other points along the common axis of the chamber 12 and the outlet tube 14, provided that the pressure at the point of introduction were less than the pressure obtaining in the reservoir 10, however sewage disruption may be less. Generally speaking, the pressure will be reduced along the whole of the common axis of the vortex chamber 12 and the outlet tube 14. However, the only essential criterion for this invention is that there be at least one location along this common axis at which the pressure is lower than that in the reservoir 10. In the remainder of this description and in the appended claims, this location will be referred to as a zone.

The objectives of disinfection are essentially to destroy pathogenic bacteria such as typhoid and paratyphoid bacteria (Salmonella), dysentery bacilli (Shigella) and viruses such as infectious hepatitis virus. Indicator organisms such as *E. coli* are customarily considered more resistant to chlorine than the pathogenic bacteria. The nature and form of active chlorine are very important in the process of killing microorganisms. The forms of active chlorine in descending order of activity are: chlorine gas, hypochlorous acid (HOCl), hypochloride ion (OCl$^-$) and the inorganic chloramines, $NH_3$-dichloramine and $NH_3$-monochloramine and finally the organic chloramines. With a waste such as sewage, it is essential for rapid disinfection that the most active forms of chlorine be brought into contact with the dispersed bacteria. In other words, there should be no clumps of bacteria which can shield some of the bacteria from attack by the disinfecting agent. In this respect, the present invention performs very well. A film of dispersed waste is exposed to the most active form, chlorine gas, in the vortex created in the outlet tube 14. Excellent mixing is also achieved which allows the HOCl and OCl$^-$ to exert their maximum effect on the bacteria. Soluble and insoluble organic matter in the waste will, of course, convert some of the chlorine to less active forms but the maximum exposure of organisms to the most active form of chlorine is achieved by means of this invention. It has been found that a 100,000 fold reduction (99.999% kill) in the numbers of indicator organisms *E. coli* are readily obtained with chlorine doses of 60 p.p.m. and contact times of five minutes on passing sewage through the apparatus of this invention.

TEST RESULTS

A vortex chamber for sewage disinfection in accordance with this invention was built to the following dimensions:

|  | Inches |
|---|---|
| I.D. of vortex chamber 12 | 4 |
| Length of vortex chamber 12 | 2½ |
| I.D. of tangential inlet 26 | 1 |
| I.D. of outlet tube 14 | 1.3 |
| Length of outlet tube 14 | 3¼ |
| I.D. of conduit 28 | ⅛ |

With the apparatus described above, it was found possible to put sewage through at the rate of 50 g.p.m. at an inlet pressure of 40 p.s.i.g.

Power calculations for the 50 g.p.m. apparatus using raw sewage as input liquid yield a result of 1.4 HP. In other words, for 72,000 Imp. gal. per 24 hours, a running power of 1.4 HP is required. It is essential that a substantially smooth flow of liquid be provided by the pump, and for this reason a progressing cavity type of pump is preferred. In the tests, a Moyno pump model 2L1OH was utilized. The pump was operated by a 5 HP motor, although, as mentioned above, the motor did not run at maximum rating.

The 5 HP motor utilized will pump 100 gals./min. against a 40 p.s.i.g. head without exceeding the maximum ampere rating of the motor, so that it can be assumed that 144,000 gals./24 hours can be pumped using the 5 HP motor. Direct extrapolation from this would indicate 35 HP for a 1 MGD operation.

CHLORINE REQUIREMENTS

The dosage of chlorine required will be dependent upon the following three factors:

(1) The chlorine demand of the sewage, i.e. the amount of chlorine "consumed" before a free residual chlorine value is obtained.

(2) The contact time which can be allowed after disruption and chlorination. A longer retention time would allow the more weakly active chlorine forms, e.g. the inorganic and organic chloramines, to exert a bactericidal effect.

(3) The coliform and total microorganisms kill required. A raw domestic sewage contains about $1 \times 10^7$ coliform organisms per 100 ml. If we specify a 5 log unit (100,000 fold reduction or 99.999% kill), this would leave approximately 100 coliforms in 100 ml. sewage. It has been determined that approximately 60 p.p.m. chlorine dose and a five to six minute contact time would achieve this kill. This dose is applicable to the highest strength domestic sewage available, i.e. the worst conditions for chlorination. An average sewage would show about 1 log unit higher kill for the same chlorine dose.

A vacuum of at least 27 inches of mercury is available with the apparatus constructed to the above specifications. At this vacuum, the draw of air into the vortex of the apparatus exceeds 15 litres per minute, and thus no difficulties should be expected in aspirating sufficient chlorine gas for disinfection.

Those skilled in the art to which this invention pertains will appreciate that disinfectants other than chlorine gas may also be used with this method and apparatus. For example, ozone, fluorine, chlorine dioxide, and other bactericidal agents can also be used. Liquid bactericides can also be utilized, of course. For example, an aqueous solution of any of the halogens or their compounds, or mixtures of the same, as well as elemental bromine, could be employed. Because this invention is suitable for use with both gaseous and liquid bactericides, the term "fluid" is used in the appended claims to denote the material drawn into the vortex by the pressure differential, and is to be considered to encompass both gases and liquids.

The utilization of chlorine dioxide in place of chlorine would not entail much change in the system for sewage treatment purposes since it is a soluble gas and is a good disinfecting agent. Ozone as a disinfecting agent is as good as chlorine but is a much less soluble gas. In order to obtain the maximum transfer or utilization of the ozone, it may be desirable to provide, for example, a tall contact tower downstream of disruption of the waste through the vortex, although modifications and additions such as this do not form part of this invention.

Naturally, the method and apparatus of this invention are also applicable to many fields outside the sewage treatment area. For example, chlorine dioxide, although it might not be preferred for water and waste treatment because of higher cost than chlorine, could well be used in, for example, pulping and bleaching applications for the pulp and paper industry.

Essentially, this invention is related to the fail-safe introduction of any fluid into any liquid, and is not to be confined to the sewage treatment area even though the latter application is particularly advantageous.

As regards the relationships between the pressures at critical points in the apparatus, the following relationship must be met in order to achieve both aspiration of the fluid into the vortex and the fail-safe characteristic:

A is greater than B and less than C

Where A denotes the absolute pressure of fluid in the reservoir 10, B denotes the absolute pressure, during operation, of the zone where the feed end 30 of the conduit 28 is located, and C denotes the absolute pressure at the downstream end 16 of the outlet tube 14.

It is considered essential that the outlet end 16 (downstream end) of the outlet tube 14 be located within a body of liquid. Otherwise, air or gas will rise centrally up the axis of the outlet tube 14 and will destroy the vortex effect. If desired, of course, the entire chamber 12 and outlet tube 14 can be immersed in a tank of liquid. It will be obvious that the liquid in the tank 20 need not be the same liquid as that in the vortex, although in the embodiment shown this is the case. It will also be obvious that, provided the pressure relationship defined above is maintained, it would be possible to seal the container 20, and raise or lower its pressure to any desired level (so long as this were above the point at which the liquid would flash to vapour). Of course, with a sealed container 20, any aspirated gas that was not completely soluble in the liquid would begin to collect at the top of the container 20, and could require venting.

While one embodiment of this invention has been shown and described herein, those skilled in the art will appreciate that changes and modifications may be made therein without departing from the spirit and scope of this invention as defined in the appended claims.

What we claim as our invention is:

1. A method for the fail-safe introduction of a bactericidal gas into liquid sewage, the method comprising the steps:
    providing a vortex chamber of circular cross-section having a tangential inlet and a coaxial outlet tube of which the downstream end terminates in a liquid body,
    continuously introducing said liquid sewage through said tangential inlet into said vortex chamber, thereby causing said liquid sewage to rotate in said vortex chamber, such that liquid sewage passes out along said outlet tube while rotating therein, thereby creating along the common axis of the vortex chamber and the outlet tube a zone in which the pressure is below that at the downstream end of the outlet tube, the liquid sewage being torn apart and disintegrated by the rotation in said outlet tube,
    providing a reservoir of said bactericidal gas at a pressure above that at said zone but below atmospheric, and
    communicating said reservoir with a location along said zone substantially at the upstream end of the outlet tube, whereby the pressure differential between said reservoir and said zone causes bactericidal gas to pass into said zone at said location.

2. A method as claimed in claim 1, in which said bactericidal gas is chlorine.

3. Apparatus for the fail-safe introduction of a bactericidal gas into liquid sewage, comprising:
    means defining a vortex chamber of circular cross-section having a coaxial outlet tube of which the downstream end terminates in a liquid body,
    a substantially tangential inlet into said vortex chamber,
    pump means for continuously introducing said liquid sewage under pressure into said vortex chamber through said tangential inlet, such that said liquid sewage is caused to rotate in said vortex chamber and to pass out along said outlet tube while rotating therein, thereby creating along the common axis of the vortex chamber and the outlet tube a zone in which the pressure is below that at the downstream end of the outlet tube, the liquid sewage being torn apart and disintegrated by the rotation in said outlet tube,
    a reservoir of said bactericidal gas under a pressure above that at said zone but below atmospheric, and
    a conduit from said reservoir to a location within said zone substantially at the upstream end of the outlet tube, whereby the pressure differential between said reservoir and said zone causes bactericidal gas to pass into said zone at said location, and such that cessation of the continuous introduction of liquid sewage into the vortex chamber halts the feed of bactericidal gas to said location.

4. Apparatus as claimed in claim 3, in which said bactericidal gas is chlorine.

References Cited

UNITED STATES PATENTS

| | | | |
|---|---|---|---|
| 2,235,998 | 3/1941 | Kleinschmidt | 210—198 X |
| 2,545,028 | 3/1951 | Haldeman | 261—112 X |
| 3,284,169 | 11/1966 | Tominaga et al. | 261—79.1 X |
| 3,300,402 | 1/1967 | Grich et al. | 210—62 X |

FOREIGN PATENTS 965,706   8/1964   Great Britain.

MICHAEL E. ROGERS, Primary Examiner

U.S. Cl. X.R.

137—98; 210—198, 512; 261—79